United States Patent
Becker et al.

(10) Patent No.: US 6,231,022 B1
(45) Date of Patent: May 15, 2001

(54) LONGITUDINAL GUIDE RAILS OF A MOTOR VEHICLE SEAT WITH A DEVICE FOR LOCKING

(75) Inventors: Burckhard Becker; Ernst-Reiner Frohnhaus, both of Solingen (DE)

(73) Assignee: C. Rob. Hammerstein & Co Kg, Solingen (DE)

( * ) Notice: Subject to any disclaimer, the term of this patent is extended or adjusted under 35 U.S.C. 154(b) by 0 days.

(21) Appl. No.: 09/312,814

(22) Filed: May 14, 1999

(30) Foreign Application Priority Data

Jun. 5, 1998 (DE) ................................. 198 25 099

(51) Int. Cl.[7] .................................................. F16M 13/00

(52) U.S. Cl. ............................. 248/429; 74/527; 248/430

(58) Field of Search .................................... 248/429, 424, 248/419, 420, 423, 430; 384/7; 74/527, 526

(56) References Cited

U.S. PATENT DOCUMENTS

| | | | |
|---|---|---|---|
| 5,172,882 | * 12/1992 | Nini | 248/430 |
| 5,560,262 | * 10/1996 | Orzech | 74/527 |
| 5,564,315 | * 10/1996 | Schuler et al. | 74/527 |
| 5,596,910 | * 1/1997 | Bauer et al. | 74/526 |
| 5,741,000 | * 4/1998 | Goodbred | 248/430 |
| 5,782,138 | * 7/1998 | Groche | 74/527 |
| 5,785,292 | * 7/1998 | Muraishi et al. | 248/429 |
| 5,816,110 | * 10/1998 | Schuler et al. | 74/527 |
| 5,918,846 | * 7/1999 | Garrido | 248/429 |

FOREIGN PATENT DOCUMENTS

2713973 * 5/1978 (DE) ................................. 248/429

* cited by examiner

Primary Examiner—Anita M. King
(74) Attorney, Agent, or Firm—John Lezdey

(57) ABSTRACT

The invention relates to a longitudinal guide rail for a motor vehicle seat which includes a device for locking the releasable fixing of a top rail and a bottom rail. The device has blocking fingers which, by a retaining spring, can engage independently from each other into a locking position and can together be pulled into a release position.

9 Claims, 1 Drawing Sheet

LONGITUDINAL GUIDE RAILS OF A MOTOR VEHICLE SEAT WITH A DEVICE FOR LOCKING

FIELD OF THE INVENTION

The invention relates to a longitudinal guide rail of a motor vehicle seat, which, in a familiar way, shows two head-on adjustable rails, namely a top rail and a bottom rail and which also has a device for locking for the releasable fixing of these two rails in opposition. Such a longitudinal guide rail is known for example from the DE 44 00 232 A1. Also here, the device for locking has more than two blocking fingers, which, loaded by an own retaining spring can engage independently from each other into a locking position and can, together, be pulled into a release position, for which a release device is provided for. In a furthermore familiar way a notching rail is allocated to the blocking fingers, which shows notches and notched openings, into the latter the blocking fingers can engage.

BACKGROUND OF THE INVENTION

In the case of such longitudinal guide rails the several locking teeth never engage together into notched openings, to the contrary in most blocking conditions at least on blocking finger rests on a notch. The blocking fingers do neither all engage in full depth into a notched opening, in the contrary, typically at least one locking tooth engages only partially into a notched opening, here it lies in most cases against a sloping side at the edge of the notched opening. For the locking only two locking fingers are needed, of which one takes charge of the locking into one sliding direction and the other of the locking into the other sliding direction. The device for locking has in most cases three to four blocking fingers.

So, in the case of a typical locking position, there generally is at least one misnotched blocking finger, typically at least one blocking finger, which only partially engages and finally at least one blocking finger, which engages fully.

Such devices for locking are especially suitable for longitudinal guide rails, but they can also be used for other manually operated locking devices on adjustable motor vehicle seats, for example for setting the angle of a rest hinged mounting or for the height adjustment of the front edge of a seat.

The unlocking hatch is constructed as delayed action switch. In the cases of an unlocking process it initially works together with at least one fully engaged blocking finger, and pulls it up. In the case of a continuation of the unlocking movement its carriers get in contact with at least the one only partially engaged blocking finger, which also is lifted up. Finally, the unlocking hatch takes, with the associated carrier, in the case of a continuation of the unlocking movement at least one blocking finger along, which is misnotched. In the case of the same being lifted up, all existing blocking fingers are picked up from the unlocking hatch. The lift movement must be carried out to such an extent, that the rails can be freely adjusted in opposition.

In the case of the described practical operation the operator feels a graded operator force. Initially only the one, fully engaged blocking finger must be lifted up via the unlocking hatch, in case of a continuation of the unlocking movement the operator force increases, if at least on partially engaged blocking finger is pulled up, finally the maximum operational force is existent, when all blocking fingers are pulled by the unlocking hatch. A user then notices during the unlocking movement of the blocking fingers a stage rising force, which is conditional of the retaining spring of the individual blocking fingers.

The above-mentioned unexamined German application offers already a solution for the fact that for the user power stages, which are as small as possible, occur during the release movement. Alternating short or longer notched openings are arranged consecutively in the notching rail.

Disturbing is the relative large construction height of the device for locking at the known longitudinal guide rails. Starting from this, it is the task of the invention to create a device for locking, especially for a longitudinal guide rail, which on the one hand allows a small construction height in the longitudinal direction of the blocking fingers and which, on the other hand, influences the operational force during the release process through suitable measures in such a way, that the described power stages, which occur during the release process, are hardly noticeable for the user.

SUMMARY OF THE INVENTION

Starting from the longitudinal guide rail of the above-mentioned kind, this task is solved by a longitudinal guide rail of a motor vehicle seat, which on the one hand has a top and a bottom rail and which, on the other hand, has a device for locking, which a) has a bearing casing, b) has a few blocking fingers, which are arranged in the bearing casing and independently from each other, are able to engage into a locking position and which can be released into a release position, c) which has an unlocking hatch, which is arranged around a swiveling axis and which, at the same time, is arranged in a swiveling manner at the bearing casing between a blocking position and a release position, which has an unlocking area and which has, for each blocking finger, a carrier for the form-locking harmonic excitation of the respective blocking finger into the release position and d) has a retaining spring for each blocking finger, which each is arranged between the unlocking hatch and the associated blocking finger.

On account of the unlocking hatch a very flat construction height of the device for locking is achievable. In the case of a suitable formation of the retaining spring, for example as leaf type springs or as spring bars, especially as operating lever springs, this is essentially only determined through the maximum required lift for the blocking fingers. On account of the unlocking hatch the retaining springs engage in from the side, that means they essentially run crosswise to the longitudinal direction of the blocking fingers. They are arranged at the unlocking hatch and thereby essentially extent parallel to the main area of this unlocking hatch. With this a considerable part of the mechanic is arranged lateral to the blocking fingers, which enables the smaller construction height.

The bearing casing can be constructed relatively easily. It is fixed on one of the two rails, typically on the top rail. The bearing casing stores the unlocking hatch. It is in a preferred embodiment of the invention furthermore responsible for the guide of the individual blocking fingers, but the guide of the individual blocking fingers can be transferred more or less onto the associated rail and onto the means which are provided there. The corresponding section of the associated rail then forms, in the sense of usage of the present description, a component part of the bearing casing.

In an especially preferred embodiment a master spring is arranged between the bearing casing and the unlocking hatch, which prestresses the unlocking hatch against the effect of the individual retaining springs into the topmost indexing position. Mechanically seen, the master springs and the group of the individual retaining springs are thus switched consecutively. The master spring loads the unlocking hatch into the topmost indexing position. The individual retaining springs load the unlocking hatch into the opposite direction. The spring tension of the master spring is selected in such a size, that in the standard condition, i.e. without an acting solving power in the unlocking area, the unlocking hatch is in the topmost indexing position. In this for example, it rests directly on the lower part of the bearing casing or on the top side of the associated rail, especially of the top rail.

The advantage of the mechanical series arrangement of the springs is in the following: In the case of a release process one initially works against the force of at least one retaining spring. If the release movement is continued, further release springs come into effect, whereby the tension of the retaining springs is continuously released. During the release process they become increasingly no longer apparent. When all blocking fingers are pulled free, i.e. they are adjacent to the carrier, no retaining spring becomes noticeable in the solving power. To the extent, in which in the duration of a release process more and more blocking fingers are pulled free, also the noticeable spring tensions of the individual retaining springs are reduced. As a whole a favorable compensation is then achieved, which makes it possible, to remove the problems of a graduated obtained solving power.

In a further, preferred embodiment, the effective line of the master spring is, in the topmost indexing position of the unlocking hatch, further distanced from the swiveling axis than in the release position of the unlocking hatch. That way the spring tension decreases progressively during the unlocking movement. To that extent, in which the individual retaining springs become continuously less noticeable during a release process, the reactive restoring force of the master spring also decreases.

In a particularly preferred embodiment the retaining springs are constructed as leaf type springs or as spring bars, thereby especially as operating lever spring. This allows a particular small construction height, furthermore also a composition of the individual springs to combination springs. A combination spring is to be understood as a composition of individual, especially of all retaining springs. Combination springs ease the fitting, because, for example, not three or four separate retaining springs have to be fitted, but only one combination spring has to be installed. The master spring itself can be constructed at liberty, it is for example a spiral tension springing, but it can also be constructed as compression spring, as torsion rod, as operating lever spring etc.

In a preferred embodiment the retaining springs support themselves at the swiveling axis. With this a well-defined allocation is given and simple fitting is possible.

BRIEF DESCRIPTION OF THE DRAWING

Further advantages and features of the invention result out of the remaining claims as well as out of the now following description of an example of the embodiment, not to be understood as restricted, which is described in the following in more detail with reference to the only figure.

DESCRIPTION OF THE PREFERRED EMBODIMENTS

Figure 1:
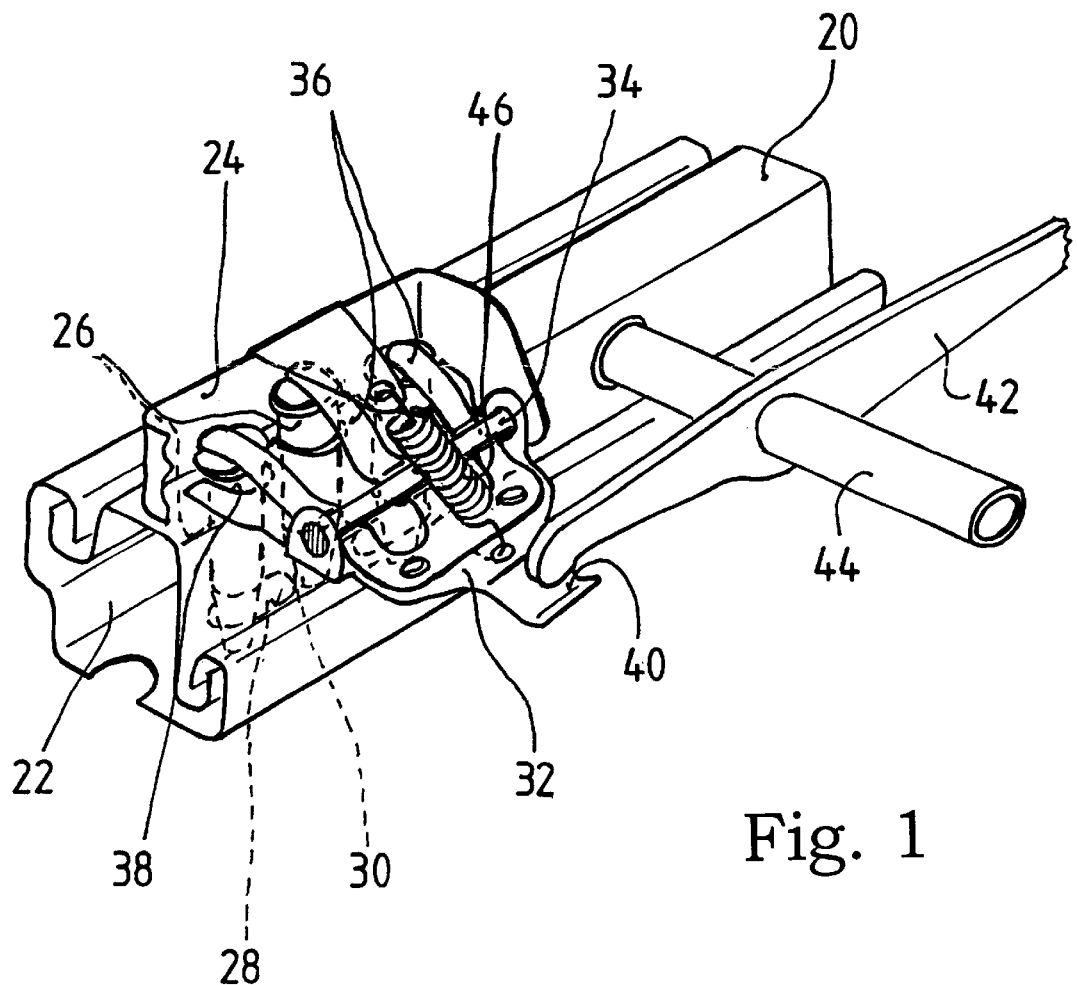
FIG. 1 shows a perspective drawing, which is partially in sectional view, of a longitudinal guide rail with a bottom rail and a top rail as well as with a device for locking.

The longitudinal guide rail has, in the known way, a top rail 20 and a bottom rail 22, which are guided via sliding devices—here not illustrated, as for example spheres, shiftable in opposition. They furthermore have, in the known way, mechanical connecting areas, which hinder a separation of the rails from each other, which for example occur under accident conditional delay forces.

On the top rail 20 a bearing casing 24 of a device for locking is arranged. It has, in the example of the embodiment illustrated here, three moveable block fingers 26 of equal construction, which are independently from each other. They are consecutively arranged in the longitudinal direction of the rail 20, 22 and have the same distance. They project through the guide holes in the top rail 20 and engage into a notching strip, which is formed out of the basis of the bottom rail 22. There, in the longitudinal direction of rails 20, 22 notched openings 28 and notches 30 are consecutively arranged.

The number of blocking fingers 26 is always at liberty, it can also be larger than three. Typically it amounts to three or four. The guide means of the blocking fingers 26 is only hinted at in FIG. 1. Guide means may be provided for in the bearing casing and in the allocated section of the top rail 20. The guide means may be, for example in the form of cylinder sleeves. With this a distance, which is as short as possible to the notched openings 28 and to the notches 30 is desired, so that tilting moments occur, which are as small as possible. But it is also possible to provide larger distances to the notched openings 28 and 30, if one consciously wants to achieve a bending of the blocking fingers 26 under accident conditional stress.

At the bearing casing 24 an unlocking hatch 32 is arranged in a swiveling manner. For this a swiveling axis 34 is provided for, which runs parallel to the longitudinal direction of the rails 20,22. Furthermore it is located next to the upper terminal areas of the blocking fingers 26 and in a certain distance as well as located on the same height there of.

A retaining spring 36 is allocated to each of the three blocking fingers 26. In the example of the embodiment, it is constructed as a leaf type spring. Each individual leaf type spring extents in the main parallel to the unlocking hatch 32. The three individual leaf type springs are combined to a multiple spring, which, essentially, has the form of an E. The individual leaf type springs project with this from a transverse area, which is fixed by means of two rivets on the unlocking hatch 32. The individual leaf type springs support themselves on the swiveling axis 34, for this they essentially have a semicircular bend. The retaining springs 36 rest with their free ends on the upper terminal area of the blocking fingers 26. This upper terminal area is thickened, underneath is a carrier 38 for each blocking finger 26. It has the form of a bay, which holds the essentially cylindrical mid-section of the associated blocking finger 26. Underneath the blocking finger is tapered in the actual blocking zone, there it is in the shape of a frustum of a cone. The width of the carriers 38 is selected in such a way, that it is smaller than the described thickening. Because of that, during the lifting the unlocking hatch 32 strikes against the respective carrier 38 at the thickening and pulls up the associated blocking finger 26 mechanically.

On the other side of the carrier 38 and near the transverse area of the multiple spring a slightly synclinal constructed unlocking area 40 is provided for. It gets into contact with a two-armed release lever 42, which is pivoted around an axis 44 in a swiveling manner on the top rail 20.

Between the unlocking area 40 and the transverse area of the multiple spring a hole is provided for, into which one terminal area of a main spring 46 engages. Its other terminal area is pivoted on a shackle, which projects above the retaining springs and essentially ends vertically above the swiveling axis 34, there a hole is provided for the hitching of the other terminal area of the master spring 46, constructed as spiral tension spring. In the case of the release swiveling of the unlocking hatch 32 out of the illustrated blocking position into the unlocking position, the unlocking area swivels downwards, that way the master spring 46 comes closer to the swiveling axis 34.

The release lever 42 has a, here not illustrated, spring-loaded resting position, in which it is free of the unlocking area 40, so that the unlocking hatch 32, under the effect of the master springs, can automatically assume the blocking position without being hereby hindered by the release lever 42. Only in the case of active operation of the release lever 42 the unlocking hatch 32 is swiveled into the unlocking position.

The spring tension of the main spring 46 is in the case of an embodiment with three blocking fingers 26, as illustrated, selected in such a way, that it is at least 1.5 times bigger than the spring tension of an individual retaining spring.

It is possible to let the master spring 46 engage with the retaining springs, for example at the transverse area of the multiple spring.

What is claimed is:

1. In a longitudinal guide rail of a motor vehicle seat, which has a top rail and a bottom rail and a device for locking, guide rail having a which comprises
   a) a bearing casing
   b) a number of blocking fingers arranged in the bearing casing, which can, independently from each other, engage into a blocking position and which can be jointly released,
   c) an unlocking hatch which
      is arranged around a swiveling axis and can be moved between said blocking position and a release position in a swiveling manner at the bearing casing,
      a form-locking contact and movement of the respective blocking finger into the release position,
   d) a retaining spring for each blocking finger which each is arranged between the unlocking hatch and the associated blocking finger, and
   e) a master spring arranged between the bearing casing and the unlocking hatch, which prestresses the unlocking hatch into the blocking position against the effect of the individual retaining springs.

2. The longitudinal guide rail according to claim 1, wherein an effective line of the master spring is further away from the swiveling axis in the topmost indexing position of the unlocking hatch than in the release position of the unlocking hatch.

3. The longitudinal guide rail according to claim 1, wherein the spring tension of the master spring is, in the case of 3 blocking fingers, at least 1.5 times larger than the spring tension of an individual retaining spring and in the case of four blocking fingers 2.5 times larger than the spring tension of a retaining spring.

4. The longitudinal guide rail according to claim 1, wherein the retaining springs are each embodied as leaf type springs or as spring bars, and as operating lever springs.

5. The longitudinal guide rail according to claim 1, wherein the retaining springs support themselves on the swiveling axis and that they are held by it.

6. The longitudinal guide rails according to claim 1, wherein the retaining springs engage with the associated blocking finger near a terminal area, and rest on the terminal area.

7. The longitudinal guide rail according to claim 1, wherein the individual retaining springs are combined to a one piece multiple spring, which has a transverse area, which transverse area supports itself on the unlocking hatch.

8. The longitudinal guide rail according to claim 1, wherein the master spring engages with the retaining springs in an area of the retaining springs which is allocated to the unlocking hatch.

9. In a longitudinal guide rail of a motor vehicle seat, which has a top rail and a bottom rail and a device for locking, the improvement which comprises said guide rail having a device for locking which comprises
   a) a bearing casing,
   b) a number of blocking fingers arranged in the bearing casing, which can, independently from each other, engage into a blocking position and which can be jointly released,
   c) an unlocking hatch which
      is arranged around a swiveling axis and can be moved between said blocking position and a release position in a swiveling manner at the bearing casing, a form-locking contact and movement of the respective blocking finger into the release position
   d) a retaining spring for each blocking finger which each is arranged between the unlocking hatch and the associated blocking finger, and whereby said retaining springs essentially run crosswise to the direction of movement to the blocking fingers.

* * * * *